United States Patent
Oomori

(10) Patent No.: US 9,071,350 B2
(45) Date of Patent: Jun. 30, 2015

(54) OPTICAL RECEIVER IMPLEMENTED WITH SEMICONDUCTOR AMPLIFIER

(71) Applicant: SUMITOMO ELECTRIC INDUSTRIES, LTD., Osaka-shi, Osaka (JP)

(72) Inventor: Hirotaka Oomori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 17 days.

(21) Appl. No.: 13/866,319

(22) Filed: Apr. 19, 2013

(65) Prior Publication Data
US 2013/0279901 A1    Oct. 24, 2013

(30) Foreign Application Priority Data
Apr. 24, 2012    (JP) ................................. 2012-098357

(51) Int. Cl.
| H04B 10/08 | (2006.01) |
| H04B 10/07 | (2013.01) |
| H04B 10/079 | (2013.01) |
| H04B 10/67 | (2013.01) |
| H04J 14/02 | (2006.01) |
| H04B 10/00 | (2013.01) |

(52) U.S. Cl.
CPC ............ *H04B 10/07* (2013.01); *H04B 10/0795* (2013.01); *H04B 10/673* (2013.01); *H04J 14/02* (2013.01)

(58) Field of Classification Search
CPC .... H04B 10/07; H04B 10/075; H04B 10/079; H04B 10/0799
USPC .............................. 398/17, 24, 25, 26, 27, 34
See application file for complete search history.

(56) References Cited

U.S. PATENT DOCUMENTS

| 6,526,112 | B1 | 2/2003 | Lai | |
| 7,362,498 | B1 | 4/2008 | Li et al. | |
| 2007/0280684 | A1* | 12/2007 | Onoda et al. | 398/38 |
| 2010/0142958 | A1* | 6/2010 | Matsumoto | 398/79 |
| 2011/0182591 | A1 | 7/2011 | Ikeuchi et al. | |
| 2011/0243576 | A1 | 10/2011 | Oomori | |

* cited by examiner

*Primary Examiner* — Daniel Dobson
(74) *Attorney, Agent, or Firm* — Global IP Counselors, LLP

(57) ABSTRACT

An optical receiver able to distinguish a failure occurred in one of multiplexed signals from a failure in the transmission medium is disclosed. The optical receiver includes an optical de-multiplexer, optical devices, a signal processor, and a controller. Each of the optical devices converts the de-multiplexed signal into an electrical signal. A clock is extracted from one of the electrical signals. The processor decides, based on the electrical signals and the clock, one of the multiplexed signals falls in a failure.

8 Claims, 2 Drawing Sheets

OPTICAL RECEIVER IMPLEMENTED WITH SEMICONDUCTOR AMPLIFIER

CROSS-REFERENCE TO RELATED APPLICATIONS

This application claims priority to Japanese Patent Application No. 2012-098357, filed in Japan on Apr. 24, 2012. The disclosure of Japanese Patent Application No. 2012-098357 is hereby incorporated herein by reference in its entirety.

BACKGROUND OF THE INVENTION

1. Field of the Invention

The present application relates to an optical receiver adaptable to an optical system that transmits a data divided into a plurality of parts each having a wavelength specific thereto and different from others. In particular, the present application relates to an optical receiver capable of distinguishing a failure occurred in a divided part.

2. Related Background Arts

As the volume to be transmitted on a communication system explosively expands, not only the speed of the transmission but the capacity thereof have been also enhanced. An optical transceiver or an optical received implemented therein has accelerates the operational speed exceeding 10 Gbps, reaching 40 or 100 Gbps. Only one optical active device becomes hard to operate in such a high speed transmission. Accordingly, architecture to divide data into several parts and to transmit each of parts on a wavelength specific thereto has been common in the field.

For instance, a data with the speed of 100 Gbps is divided into four parts each having the speed of 25 Gbps, and four optical transmitters transmit each of the four parts carrying on a wavelength different from others in 1300 nm wavelength band. While in an optical receiver, the optical signal incoming therein is de-multiplexed into four parts each being detected by an optical device independent to each other. Thus, the total 100 Gbps transmission is realized.

However, the 1300 nm wavelength band is inherently attributed with an optical loss by the transmission medium, typically, an optical fiber. A semiconductor optical amplifier (hereafter denoted as SOA) is usually set in the front end of the optical receiver to amplify the weakened incoming optical signal. An SOA evens a level of the optical signal to be suitable for the optical devices set in the downstream of the optical de-multiplexer even when only one of parts of the incoming optical signal is lost and the level thereof is lowered. Then, the data recovered from the transmitted data becomes meaningless.

SUMMARY OF THE INVENTION

An aspect according to an embodiment of the present invention relates to an optical receiver that receives an optical signal multiplexing a plurality of signals each having a specific wavelength different from others. The optical receiver includes an optical de-multiplexer, a plurality of optical devices, a signal processor, and a controller. The optical de-multiplexer de-multiplexes the optical signal into a plurality of de-multiplexed signals. Each of the optical devices converts the de-multiplexed optical signal into an electrical signal. The signal processor extracts a clock contained in one of electrical signals output from the optical device. A feature of the embodiment is that the controller decides a failure occurred in at least one of signals by receiving the clock extracted by the signal processor and the electrical signals each output from the optical devices.

The controller includes a temporary register, a first arithmetical unit, and a first comparator. The temporary register storing the electrical signals in a magnitude thereof. The first arithmetical unit calculates a time variation of the electrical signals that are compared with a first reference by the comparator.

A feature of the controller is that a second arithmetical unit and a second comparator are prepared in the controller. The second arithmetical unit calculates differences between the time variation of the electrical signals calculated by the first arithmetical unit, and the second comparator compares these differences with the second reference. When at least one of differences exceeds the second reference, the controller asserts an alarm of at least one of signals is lost.

Another feature of the controller is that, even when all of the differences are less than the second reference, the controller asserts the alarm when the clock extracted by the signal processor is lost.

Another aspect of the present application relates to a method to control an optical receiver that receives an optical signal multiplexing a plurality of signals. The optical receiver includes an optical de-multiplexer, and a plurality of optical devices. The optical de-multiplexer de-multiplexes the optical signal into the signals each having a wavelength specific thereto and difference from others. Each of the optical devices converts the signal into an electrical signal. The method of an embodiment includes steps of, extracting a clock contained in optical signal from at least one of electrical signals; calculating time variations of electrical signals; calculating differences between time variations; and asserting an alarm when at least one of differences exceeds a reference.

The method of the embodiment asserts the alarm when the clock is unable to be extracted even when all of the differences are less than the reference. Moreover, the method ceases the calculation of the differences when all of the time variations are less than another reference.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF PREFERRED EMBODIMENTS

Figure 1:
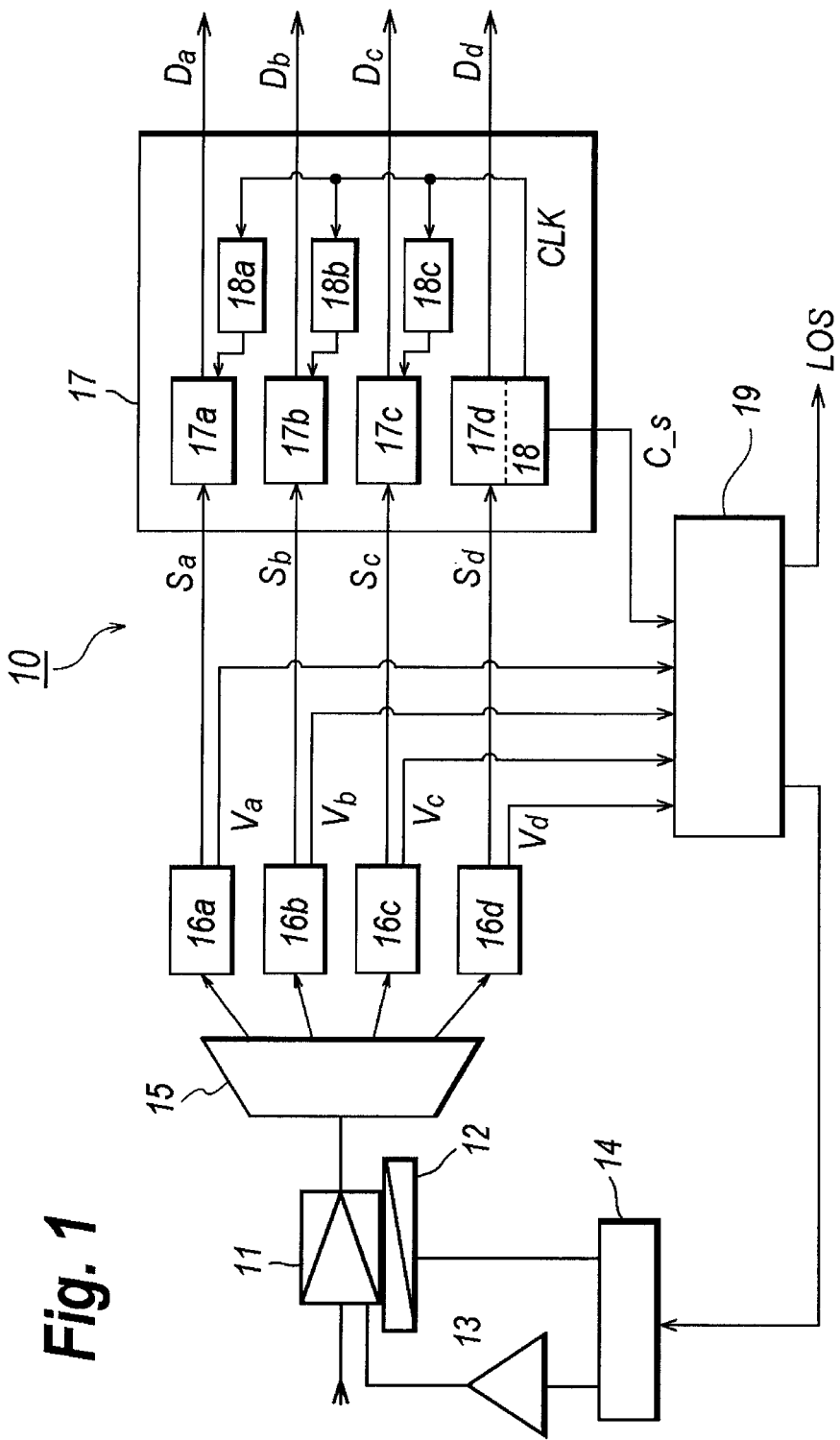
FIG. 1 shows a functional block diagram of an optical receiver according to an embodiment of the invention.

A conventional optical receiver comparable to the present embodiment provides an SOA in the front end thereof to amplify the incoming optical signal, an optical de-multiplexer to de-multiplex the amplified optical signal into a plurality of de-multiplexed signals, a plurality of optical devices each detecting respective de-multiplexed signals, and a signal processor to recover data and a clock contained in the de-multiplexed optical signals. Each of data or the clock has a speed of, for instance, 25 Gbps to realize the total transmission speed of 100 Gbps when four data are contained in the signal incoming thereto.

In such an optical system adaptable to a comparable optical receiver, one of optical devices in an optical transmitter to emit a signal sometimes falls in a failure. In such a case, the output power of the optical transmitter multiplexing respective optical signals lowers by about 6 dB. An optical receiver that receives such a multiplexed optical signal, even when the power level of the optical signal incoming thereto lowers by an amount above, the controller implemented within the optical receiver adjusts the gain of the SOA set in the front end thereof so as to be suitable for the optical devices placed in the downstream of the de-multiplexer. Thus, an arrangement to monitor only the power level of the optical signal is hard or impossible to distinguish a failure occurred in one of the signals from, for instance, the increase of an optical loss caused in the transmission medium.

In a case where the signal processor set in the downstream of the optical devices extracts the clock and recover the data from all of the de-multiplexed optical data, the failure occurred in the specific data could be distinguishable. However, this arrangement of the signal processor makes the size thereof large and the architecture thereof complex, which prevents the downsizing of the optical receiver.

Next, one preferred embodiment according to the present invention will be described as referring to FIG. 1. The optical receiver 10 of the embodiment primarily comprises an SOA 11, an optical de-multiplexer 15, a plurality of optical devices, 16a to 16d, a signal processor 17, and a controller 19. The present optical receiver 10 includes four optical devices, 16a to 16d, each receiving signals with a wavelength specific thereto and different from others. The signal processor 17 includes a plurality of re-shapers, 17a to 17d, and a clock recovery 18. Each of re-shapers, 17a to 17d, corresponds to the optical device, 16a to 16d.

The optical receiver 10 of the embodiment shown in FIG. 1 receives the optical signal that multiplexes a plural signals, amplifies the optical signal by the SOA, de-multiplexes the amplified optical signal into the signals depending on wavelengths thereof, and re-shapes data each contained in the signals by the signal processor. The explanation presented below assumes that the optical signal input to the optical receiver 10 multiplexes four signals each having the wavelength in 1300 nm band and the speed of 25 Gbps, which realizes the total transmission speed of 100 Gbps.

The SOA 11, which amplifies the optical signal as described above, couples with the current source 13 to vary the optical gain thereof. That is, the optical gain of the SOA 11 depends on the bias current supplied from the current source 13. The current source 13 is coupled with the driver 14 to adjust the bias current. For instance, when the output of the SOA 11 is weak, the controller 19 sends a command to the current source 13 to increase the bias current through the driver 14, while, the current source 13 is controlled to reduce the bias current when the output of the SOA 11 is enhanced by the controller 19 through the driver 14.

The SOA 11 is also controlled in a temperature thereof. For instance, the SOA 11 is primarily made of semiconductor material generally showing a temperature dependence of the band gap wavelength, or equivalently the band gap energy thereof, and/or the carrier concentration, which is equivalently the optical gain. The temperature controller 12, typically, a thermo-electric cooler (TEC) formed by Peltier element keeps the temperature of the SOA 11 in constant to be, for instance, 25° C. The temperature controller 12 is also controller by the controller 19 through the driver 14.

The output of the SOA 11, namely, amplified optical signal is provided to the optical de-multiplexer 15 to be de-multiplexed into four (4) de-multiplexed signals. These de-multiplexed signals are received by respective optical devices, 16a to 16d. When the optical signal coming to the optical receiver 10 has wavelengths in the 1300 nm band, the de-multiplexed optical signals each has the center wavelength of, 1295 nm, 1300 nm, 1304 nm, and 1309 nm, respectively.

Each of the optical devices, 16a to 16d, includes a semiconductor light-receiving device, typically, a semiconductor photodiode (PD) and a current-to-voltage converter, typically, a trans-impedance amplifier (TIA) to convert a photocurrent generated by respective PDs into a voltage signal, Sa to Sd. The optical devices, 16a to 16d, also provide monitoring signals, Va to Vd, each reflecting a magnitude of respective de-multiplexed signals, to the controller 19.

The voltage signals, Sa to Sd, each including a data and a clock, are provided to the signal processor 17. The signal processor 17 includes a plurality of re-shapers, 17a to 17d, each including a D-type flip/flops (D-F/F). The number of re-shapers, 17a to 17d, is often equal to the number of channels contained in the input optical signal. At least one of data, for instance, the data Sd in the embodiment shown in FIG. 1 is provided to the clock extractor 18 that includes a phase locked loop (PLL).

The re-shaping of the data Sd input to the D-F/F 17d is performed by the clock CLK recovered by the clock extractor 18. That is, the D-F/F of the re-shapers 17d receive the data Sd from the optical device in the D-input thereof, while, the clock extracted by the clock extractor 18 is set in the clock input; then, the data Sd is re-shaped and re-timed by the D-F/F 17d. Other data, Sa to Sc, are also re-shaped and re-timed by using the clock CLK extracted by the clock extractor 18 through respective delays, 18b and 18c. Re-shaped and re-timed data, Da to Dd, are output from the optical receiver 10 to be input to a circuit provided in the downstream of the optical receiver 10.

The clock extractor 18 will be described. The clock extractor 18 often includes the PLL to generate the clock CLK synchronized with the de-multiplexed signal Sd, and an interface to output a clock status C_s that denotes whether the clock extractor 18 ordinarily extracts or re-generates the clock CLK or not. When the clock CLK is normally extracted, the status C_s is asserted. On the other hand, the status C_s is negated when the clock CLK is not recovered or extracted normally.

Each of the monitoring signals, Va to Vd, is provided to the controller 19 from the optical device. The controller 19 also receives the clock status C_s coming from the signal processor 17 and generates an alarm LOS that denotes an abnormally of at least one of de-multiplexed signals.

Figure 2:
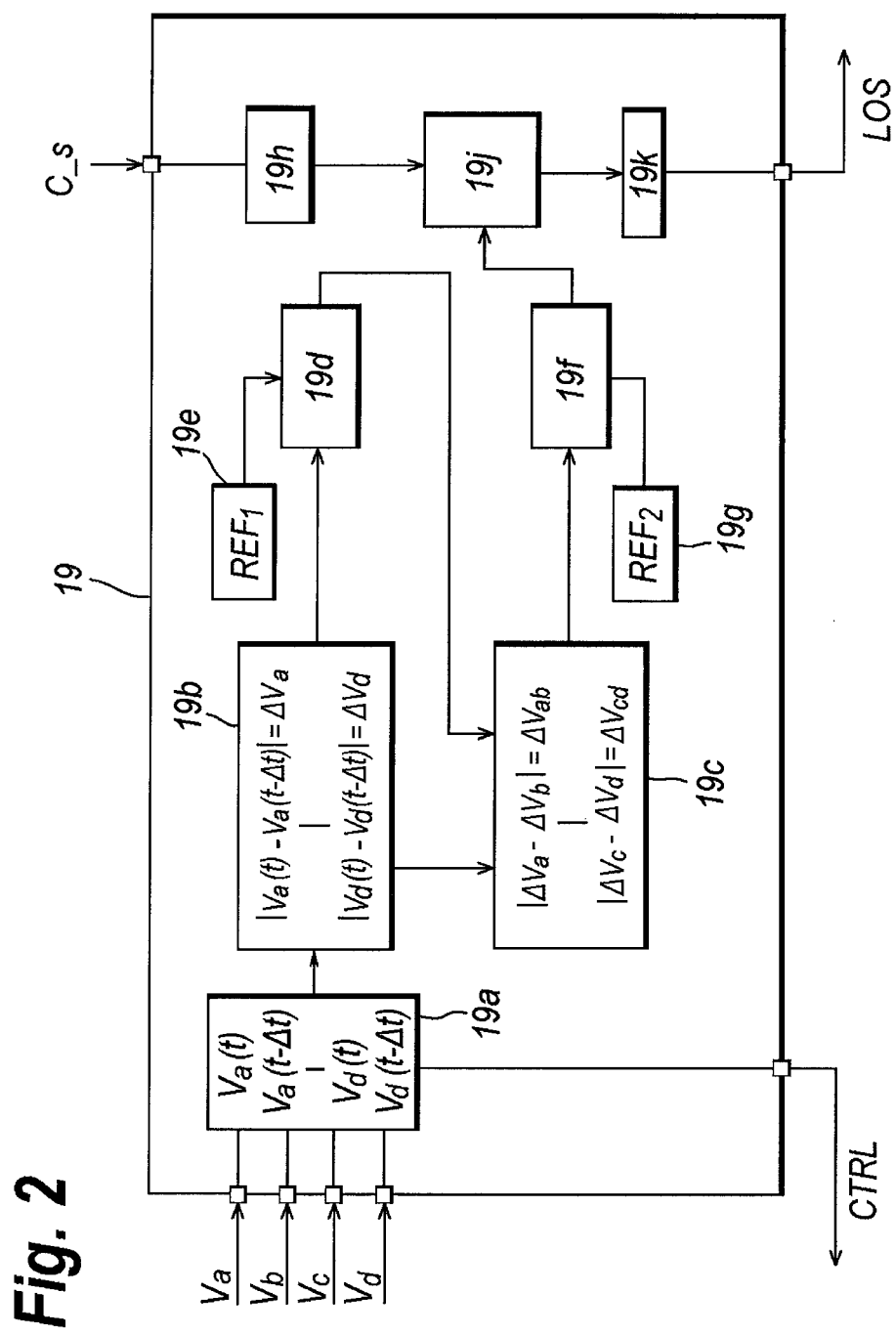
FIG. 2 shows a functional block diagram of a controller implemented within the optical receiver shown in FIG. 1.

FIG. 2 shows a functional block diagram of the controller 19. The controller 19 primarily includes a temporal register 19a, two arithmetical units, 19b and 19c, two comparators, 19d and 19f, two references, 19e and 19g, an interface 19h for the clock status C_s, a flag generator 19j, and another interface 19k for outputting a status of Loss-Of-Signal (LOS).

The temporal register 19a is provided in the front end of the controller 19 to store data, Va to Vd, temporarily. The register 19a also stores data precede to the current data by a period Δt. That is the temporal resister 19a holds the current data, Va(t) to Vd(t), and the preceding data, Va (t−Δt) to Vd(t−Δt). The period Δt corresponds to a sampling period and is practically several tenses to several hundred of milli-seconds.

The first arithmetical unit 19b differentiates two data in order to obtain a time variation of respective data; that is, the first arithmetical unit 19b calculates differences, ΔVa to ΔVd, each obtained by Va(t)−Va(t−Δt), Vb(t)−Vb(t−Δt), Vc(t)−Vc (t−Δt), Vd(t)−Vc(t−Δt). The time variations, ΔVa to ΔVd, have their ordinary meaning, namely, a rate of change of the data. When the change of the optical signal input to the optical receiver 10 is small, the time variation ΔV becomes smaller.

The time variations, ΔVa to ΔVd, calculated by the first arithmetical unit 19b are differentiated by the second arithmetical unit 19c. Specifically, a difference between the first time variation ΔVa and the second one ΔVb is calculated in order to obtain a difference ΔVab; that between the first one ΔVa and the third one ΔVc is given by ΔVac; that between the first one and the fourth one is given by ΔVad. Those for the second time variation ΔVb, and that for the third time variation ΔVc, are also calculated as ΔVbc, ΔVbd, and ΔVcd. These derivations correspond to a variation of the optical input power between respective optical devices, 16a to 16d. The second comparator 19f compares these second differences, ΔVnm, where n and m are selected from "a" to "d", with the second reference $y_{ref}$.

When the differences ΔVnm is greater than the reference $y_{ref}$, at least one of optical devices, 16a to 16d, receives an abnormal signal caused by, for instance, a breakage of transmission medium. This abnormal is detected by the flag generator 19j and transmitted to the host device through the interface 19k as the status LOS.

The controller 19 also provides the interface 19h to receive the clock status C_s from the signal processor 17, where the clock status C_s indicates whether the signal processor 17 ordinary recovers the clock contained in the transmitted data. When the clock status C_s is negated, the signal processor 17 is unable to recover the clock from the data Sd, which means that at least the data Sd is caused in failure. Moreover, when all of the differences, ΔVab to ΔVcd, calculated by the second arithmetical unit 19c are less than the second reference $y_{ref}$, all signals, Sa to Sd, are caused in a failure.

The controller of the embodiment is able to detect which data, Sa to Sd, is in failure by the procedure described below as by using the clock status C_s as a trigger. For instance, when the first arithmetical unit 19b generates the fourth time variation ΔVd greater than the first reference $x_{ref}$ and the clock status C_s is negated, the controller 19 decides that the fourth data Sd is in a failure.

While, when the clock status C_s is asserted, the controller 19 decides that at least the data Sd is not in a failure. Moreover, the second differences of the fourth time variation ΔVd with respect to any other time variations, ΔVa to ΔVc, namely, ΔVad, ΔVbd, and ΔVcd, are greater than the second reference $y_{ref}$, the controller 19 decides that the data Sa to Sd are in a failure.

When all of the differences, ΔVab to ΔVcd, are less than the second reference $y_{ref}$ and the clock status C_s is asserted, namely, the clock is ordinarily recovered, all data, Sa to Sd, are in normal. The controller 19, by deciding that all data, Sa to Sd, are in normal, controls the bias current of the SOA 11.

The controller 19 compares the time variation, ΔVa to ΔVd, calculated in the first arithmetical unit 19a with the first reference $x_{ref}$ by the first comparator 19d. When all of the time variations, ΔVa to ΔVd, are less than the first reference $x_{ref}$, all data, Sa to Sd, are in normal and preferably keeps the current conditions of the SOA 11, the calculations by the second arithmetical unit 19c and the comparison with the second reference $y_{ref}$ by the second comparator 19f become unnecessary. In such a case, the control of the bias current provided to the SOA 11 is also unnecessary and preferably breaks the communication between the controller 19 and the SOA driver 14. Synchronizing with a status where at least one of the time variations, ΔVa to ΔVd, becomes greater than the first reference $x_{ref}$, the communication recovers.

As described above, when a wavelength multiplexed optical signal is de-multiplexed into signals each received by respective optical devices, the embodiment enables, by monitoring not only the time variations of the optical level of the incoming signals but those between the signals and by implementing with the clock extractor only for one of signals, to detect the failure occurring in the other signals and to recover the data contained in the other signals not extracted the clock thereof. Thus, the embodiment makes the arrangement of the optical receiver in simple and compact.

The system adaptable to the optical receiver of the embodiment inevitably uses a set of wavelengths, where the embodiment is implemented with four (4) wavelengths in 1300 nm band with a span of 800 GHz. In such a system, the transmission medium, namely, an optical fiber transmitting the optical signals, evenly affects the optical signals. Different from an ordinary WDM system where a specific wavelength is added and dropped; or an optical signal with the specific wavelength switches the transmission medium, when the specific wavelength shows a stable time variation, other wavelengths are reasonably estimated to be stable in the time variation.

The optical input power lowers by about 6 dB when one of data, or signal with the specific wavelength, loses. However, an arrangement to monitor only the lowering of the optical input power is hard to distinguish the the loss of only one of the signal from the increase of the loss occurring in the transmission medium. On the other hand, the embodiment compares the time variation of the optical input power between respective optical signals, and decides, even when one of the optical signals lowers in the optical level thereof, that only this optical signal losses when the other optical signals show the stable optical power.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

I claim:

1. An optical receiver to receive an optical signal multiplexing a plurality of signals each having a specific wavelength different from others, comprising:
   an optical de-multiplexer to de-multiplex the optical signal into a plurality of de-multiplexed signals;
   a plurality of optical devices each converting the de-multiplexed signal into an electrical signal;
   a signal processor for extracting a clock contained in one of electrical signals output from the optical device; and
   a controller configured to decide a failure occurred in at least one of signals by receiving the clock extracted by the signal processor and the electrical signals each output from the optical devices,
   wherein the controller includes a temporary register, a first arithmetical unit, and a first comparator, the temporary register storing the electrical signals in a magnitude thereof, the first arithmetical unit calculating time variations of the electrical signals that are compared with a first reference by a first comparator.

2. The optical receiver of claim 1,
   wherein the controller further includes a second arithmetical unit and a second comparator, the second arithmetical unit calculating differences between the time variation of the electrical signals, the second comparator comparing the differences with a second reference, wherein the controller generates an alarm when at least one of differences is greater than the second reference.

3. The optical receiver of claim 2,
wherein the controller generates the alarm when the clock is lost even when the second comparator decides that all of differences are less than the second reference.

4. The optical receiver of claim 2,
wherein the second arithmetical unit ceases the calculation of the differences when the first comparator decides that all of the time variation of the electrical signals is less than the first reference.

5. The optical receiver of claim 1,
further including a semiconductor optical amplifier (SOA) set in a front end of the optical receiver,
wherein the SOA is controlled in an optical gain thereof by the controller when the controller decides that all of the signals are normal.

6. A method to control an optical receiver that receives an optical signal multiplexing a plurality of signals, the optical receiver including an optical de-multiplexer to de-multiplex the optical signal into the signals each having a wavelength specific thereto and difference from others, a plurality of optical devices each converting the signal into an electrical signal, the method comprising steps of:
extracting a clock contained in optical signal from at least one of electrical signals;
calculating time variations of electrical signals;
calculating differences between time variations; and
asserting an alarm when at least one of differences exceeds a reference.

7. The method of claim 6,
further including a step of asserting the alarm when the clock is unable to be extracted even when all of the differences are less than the reference.

8. The method of claim 6,
further including a step of ceasing the calculation of the differences when all of the time variations are less than another reference.

* * * * *